(12) United States Patent
Girnus et al.

(10) Patent No.: US 12,110,942 B2
(45) Date of Patent: Oct. 8, 2024

(54) CRANKSHAFT ASSEMBLY WITH A CENTRIFUGAL PENDULUM ATTACHED TO THE CRANKSHAFT

(71) Applicant: Schaeffler Technologies AG & Co. KG, Herzogenaurach (DE)

(72) Inventors: Mathias Girnus, Buhl (DE); Pascal Strasser, Aschbach (DE); Roman Weisenborn, Achern (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 18/010,195

(22) PCT Filed: May 18, 2021

(86) PCT No.: PCT/DE2021/100438
§ 371 (c)(1),
(2) Date: Dec. 13, 2022

(87) PCT Pub. No.: WO2021/254557
PCT Pub. Date: Dec. 23, 2021

(65) Prior Publication Data
US 2023/0235811 A1 Jul. 27, 2023

(30) Foreign Application Priority Data
Jun. 17, 2020 (DE) .................. 10 2020 115 929.3

(51) Int. Cl.
*F16F 15/14* (2006.01)
*F16C 3/10* (2006.01)
*F16F 15/28* (2006.01)

(52) U.S. Cl.
CPC .............. *F16F 15/145* (2013.01); *F16C 3/10* (2013.01); *F16F 15/283* (2013.01)

(58) Field of Classification Search
CPC ......... F16F 15/145; F16F 15/283; F16F 15/12
See application file for complete search history.

(56) References Cited

U.S. PATENT DOCUMENTS

| | | | |
|---|---|---|---|
| 10,295,014 B2* | 5/2019 | Chottiner | .................. F16C 3/06 |
| 2017/0146091 A1 | 5/2017 | Chottiner | |
| 2018/0066728 A1 | 3/2018 | Chottiner | |

FOREIGN PATENT DOCUMENTS

| | | | |
|---|---|---|---|
| CN | 105387126 A * | 3/2016 | .............. F16F 15/14 |
| DE | 3703182 A1 | 8/1987 | |

(Continued)

OTHER PUBLICATIONS

See Corresponding Search Report for International Application PCT/DE2021/100438.

*Primary Examiner* — Thomas C Diaz
(74) *Attorney, Agent, or Firm* — Davidson Kappel LLC (57) ABSTRACT

A crankshaft assembly for a motor vehicle drive train includes a crankshaft segment and a centrifugal pendulum secured to same, which has a carrier secured to the crankshaft segment and at least one pendulum mass that moves relative to the carrier along a predetermined track. The crankshaft assembly has a rupture containment means, which engages radially externally around the centrifugal pendulum such that components of the centrifugal pendulum coming lose during rotation of the centrifugal pendulum are collected by the rupture containment means.

17 Claims, 3 Drawing Sheets

(56) References Cited

FOREIGN PATENT DOCUMENTS

| | | |
|---|---|---|
| DE | 19949206 A1 | 4/2000 |
| DE | 102006043621 A1 | 4/2007 |
| DE | 102015213113 A1 | 1/2016 |
| DE | 102014221413 A1 | 4/2016 |
| DE | 102016121397 A1 | 5/2017 |
| DE | 102017120426 A1 | 3/2018 |
| DE | 102018130517 A1 | 6/2020 |
| WO | WO2019174665 A1 | 9/2019 |

* cited by examiner

CRANKSHAFT ASSEMBLY WITH A CENTRIFUGAL PENDULUM ATTACHED TO THE CRANKSHAFT

CROSS-REFERENCE TO RELATED APPLICATIONS

This application is the U.S. National Phase of PCT Appln. No. PCT/DE2021/100438 filed May 18, 2021, which claims priority to DE 10 2020 115 929.3, filed Jun. 17, 2020, the entire disclosures of which are incorporated by reference herein.

TECHNICAL FIELD

The present disclosure relates to a crankshaft assembly for a motor vehicle drive train. The crankshaft assembly has a crankshaft segment and a centrifugal pendulum attached thereto. The centrifugal pendulum has a carrier secured to the crankshaft segment and at least one pendulum mass that moves relative to the carrier along a predetermined track.

BACKGROUND

It is already known from the prior art to attach a centrifugal pendulum to a crankshaft to absorb natural frequency vibrations of the crankshaft. For example, DE 10 2016 121 397 A1 and DE 10 2017 120 426 A1 each disclose a pendulum assembly radially attached to an outer peripheral surface of the crankshaft.

However, the prior art still has the disadvantage that the provision of a centrifugal pendulum requires additional installation space and increases the overall weight of the crankshaft, and that connecting the centrifugal pendulum to the crankshaft can weaken the crankshaft.

SUMMARY

It is therefore an object of the present disclosure to avoid or at least to mitigate the disadvantages of the prior art. In particular, a crankshaft assembly is to be provided in which a centrifugal pendulum can be designed in a space-efficient and weight-efficient manner and be attached to the crankshaft without negative effects on the functionality, strength, manufacturability and/or costs.

Accordingly, the crankshaft assembly has a crankshaft segment, i.e., an in particular axial section of a crankshaft, and a centrifugal pendulum which is fastened, in particular directly, to the crankshaft segment. The centrifugal pendulum serves to absorb the natural frequency vibration of the crankshaft. Torsional vibrations/twisting of the crankshaft can therefore be eliminated by the centrifugal pendulum. Preferably, the centrifugal pendulum is tuned to higher orders of vibration; for example, orders of vibration greater than a first order, preferably greater than a second order. For example, the centrifugal pendulum can be tuned to a third order, a fourth order, a four and a half order, a sixth order, or the like.

The centrifugal pendulum has a carrier secured to the crankshaft segment and at least one pendulum mass that moves relative to the carrier along a predetermined track. In order to fulfill the resonance condition for compensating for torsional vibrations, the raceway preferably has portions in the circumferential direction and in the radial direction.

In particular, the crankshaft segment can have a mass region arranged eccentrically (to the axis of rotation of the crankshaft/of the crankshaft segment) through which an imbalance arises/is forced during operation/during rotation of the crankshaft assembly. The mass region is formed, for example, by a connecting rod bearing region of the crankshaft segment.

The crankshaft assembly has a rupture containment means (catcher) that is particularly secured to the crankshaft segment, which engages radially externally around the centrifugal pendulum such that components of the centrifugal pendulum that come loose when the centrifugal pendulum rotates are caught and/or braked by the rupture containment means. In other words, the centrifugal pendulum is potted by the rupture containment means, so that it is encompassed/enclosed radially on the outside. This has the advantage that components that come loose as a result of the rotation cannot be thrown outwards in an uncontrolled manner. The rupture containment means accordingly form a barrier for components flying outwards due to the centrifugal force, as a result of which damage to other components of the motor vehicle drive train can be prevented.

According to a preferred embodiment, the rupture containment means can have a radial section, which extends radially outwards on a first axial side of the centrifugal pendulum (opposite the crankshaft segment), and an outer axial section, which extends radially externally to the centrifugal pendulum from the radial section, in particular from a radially outer end of the radial section, in the axial direction to a second (facing the crankshaft segment) axial side of the centrifugal pendulum. In other words, the rupture containment means extend on a radial external side of the centrifugal pendulum in the direction of the crankshaft segment. In particular, the outer axial section extends at least far enough for the pendulum mass(es) to be completely covered in the axial direction. In particular, the radial section is extended radially so far outwards that it extends radially externally beyond the centrifugal pendulum (the pendulum mass). The outer axial section and the radial section are connected, for example, via an offset/curvature.

According to the preferred embodiment, the outer axial section can extend over a circumferential section of less than 360°, preferably between 90° and 270°. In other words, the outer axial section has a cross-section in the shape of a circular arc. In particular, the outer axial section only extends over that circumferential section in which the pendulum mass(es) is/are arranged. This has the advantage that the rupture containment means is only formed where it has to fulfill its function, so that material and thus weight can be saved. In particular, the space required for the crankshaft segment is not restricted by the rupture containment means.

According to a preferred embodiment, the crankshaft assembly can have a friction device, which is connected to the carrier, in particular in a non-rotatable manner, and which rests against the at least one pendulum mass in such a way that the friction device applies to the pendulum mass a frictional moment counteracting the relative movement when the pendulum mass moves relative to the carrier. This has the advantage that the additional friction, which acts on the relative movement/vibrating movement of the centrifugal pendulum, in particular of the pendulum masses, improves isolation of the natural frequency vibration of the crankshaft and a required swing angle can be reduced. In this way, the functional parameters such as mass, swing angle and friction can be provided to the required extent.

According to the preferred embodiment, the friction device can have a friction element resting against the pendulum mass, a receiving disc non-rotatably connected to the carrier and a spring element supported/tensioned axially between the friction element and the receiving disc. A normal force/axial force is applied to the friction element by the spring element and presses the friction element axially against the pendulum mass.

According to the preferred embodiment, the friction device can additionally have a cover disc arranged axially between the spring element and the friction element. By providing the cover disc, a contact surface between the spring element and the friction element, i.e., to the friction element, can be enlarged, so that a permissible surface pressure of the friction element is not exceeded.

According to an advantageous development, the friction element can be connected to the receiving disc in a non-rotatable manner, in particular in a form-fitting rotationally secured manner. This advantageously defines a friction point between the friction element and the pendulum mass, at which point the friction torque generated counteracts the relative movement between the pendulum mass and the carrier.

According to the preferred embodiment, the friction device, in particular the receiving disc, can form the rupture containment means. This means that a component, in particular the receiving disc, is extended such that it engages radially externally around the centrifugal pendulum and can serve as rupture containment means. This has the advantage that no additional components have to be provided to form the rupture containment means. Due to its structure, the receiving disc can be lengthened in a particularly suitable manner without affecting other functions of the receiving disc or the centrifugal pendulum.

The receiving disc can preferably be designed as a potted sheet metal component. A sheet metal component can be brought into a desired pot-like shape in a particularly simple manner. Potted means in particular that the receiving disc has the radial section and the outer axial section as well as an inner axial section which extends from a radially inner end of the radial section in the axial direction, in particular towards the second axial side of the centrifugal pendulum. Thus, the radial section and the two axial sections form a U-shape in longitudinal section, within which the pendulum mass(es) of the centrifugal pendulum is/are arranged (so that the pendulum mass(es) are encompassed). The pot-like cranking of the receiving disc improves the stability of the receiving disc.

In particular, the receiving disc can be formed without cutting; for example, as a formed component, preferably as a deep-drawn component. The geometry, in particular the U-shape and/or the S-shape, can thus be produced easily.

According to a preferred embodiment, the friction element can be accommodated on its radial outside in a non-rotatable manner in the receiving disc, in particular the axial section of the rupture containment means/the receiving disc. As a result, the friction element can be arranged radially further to the outside, so that the friction surface is advantageously enlarged.

According to the preferred embodiment, the friction element can have projections protruding radially outwards, which engage in corresponding recesses of the receiving disc to prevent rotation. In other words, the anti-rotation device is implemented by recesses in the receiving disc and penetrations in the friction element. In this way, the friction element can be attached to the receiving disc in a form-fitting, non-rotatable manner that is simple to produce.

According to the preferred embodiment, the receiving disc can alternatively (or additionally) have radially inwardly protruding formed regions, for example in the manner of an arc spring stop in a dual-mass flywheel, which engage in corresponding pockets of the friction element to prevent rotation. In this way, the friction element can be attached to the receiving disc in a form-fitting, non-rotatable manner that is simple to produce.

According to a preferred embodiment, the friction element can rest axially against the radial section of the receiving disc. The fact that the friction element is supported over a large region on both sides advantageously prevents the friction element from tilting.

According to a preferred embodiment, the friction device can be of axisymmetric design. In particular, an axis of symmetry of the friction device can correspond to an axis of symmetry of the mass region, which orthogonally intersects the axis of rotation, for example. Such a configuration has a particularly advantageous effect on a concentricity/imbalance compensation of the crankshaft segment.

In one embodiment, the friction device can be designed to run around in the circumferential direction. For example, the friction element can have the shape of a circular ring in cross-section, i.e., it can be designed as a friction ring. A rotationally symmetrical design of the friction element means that it can be manufactured particularly inexpensively and assembled easily.

The receiving disc can be designed, for example, as a potted sheet metal component. For example, the receiving disc is manufactured without cutting, for example as a formed component, in particular a deep-drawn component. The receiving disc can preferably have two radial sections connected to one another via an axial section, resulting in a substantially S-shape in longitudinal section. A first (inner) radial section can serve as a fastening section for attachment to the crankshaft segment. A second (outer) radial section can serve as a supporting section for axially supporting the spring element and/or the friction element. The receiving disc can be folded over at its radially outer end, i.e., it can have an axial projection against which the friction element rests in the circumferential direction.

The spring element can be designed as a disc spring or a corrugated spring. In particular, the spring element can be attached to the receiving disc in a non-rotatable manner. For example, the spring element can be non-rotatably attached to the receiving disc by a riveted connection.

According to a preferred embodiment, the centrifugal pendulum can be dimensioned with respect to its mass and its position on the crankshaft segment selected so that the centrifugal pendulum during operation, i.e., during rotation of the crankshaft segment, has an imbalance-compensating effect on the crankshaft segment. This means that the centrifugal pendulum as such forms an imbalance compensation mass for the crankshaft/crankshaft segment. The centrifugal pendulum thus replaces an unbalanced mass (which should otherwise be provided, i.e., if there is no centrifugal pendulum). It can therefore be said that an imbalance occurring during rotation of the crankshaft segment is predominantly or completely compensated for by the selection of the mass of the centrifugal pendulum and a fastening location of the centrifugal pendulum on the crankshaft segment. This has the advantage that the centrifugal pendulum does not only fulfill the actual cancellation function, but also acts as an unbalance compensation. Due to this dual function of the centrifugal pendulum, the total mass/the total weight of the crankshaft assembly (or the crankshaft) does not increase due to the provision of the centrifugal pendulum. Since the centrifugal pendulum replaces an imbalance mass, the individual mass/the individual weight of the crankshaft segment is reduced by the imbalance mass replaced/eliminated by material removal, which in turn corresponds to the individual mass/the individual weight of the added centrifugal pendulum. Put simply, the weight of the crankshaft remains the same with and without the centrifugal pendulum. In other words, an unbalanced mass of the crankshaft has an additional centrifugal pendulum function.

According to a preferred embodiment, the crankshaft segment can have a front-side recess for accommodating at least a part of the centrifugal pendulum. The recess can in particular be dimensioned/have such a dimension that the recess has an imbalance-compensating effect when the crankshaft segment rotates. This means that, in particular, so much material/mass is removed for the recess that it is compensated for again by the provision of the additional components, namely the centrifugal pendulum. The recess can be provided subsequently by machining or already in the raw part on the crankshaft segment. Manufacturing costs can be saved as a result.

According to the preferred embodiment, the volume of the recess can be at least partially compensated by the volume of the centrifugal pendulum. In other words, the recess is arranged in such a way that the volume can be used to arrange the components such as the centrifugal pendulum.

In particular, the recess can be arranged in the axial direction essentially at the same height as the mass region of the crankshaft segment. The recess can also be arranged essentially opposite the mass region in the circumferential direction. Furthermore, it can be expedient to arrange the recess essentially radially at the same distance from the axis of rotation as the mass region, for example a center of gravity of the mass region, is away from the axis of rotation (in the other direction).

According to an advantageous embodiment, the centrifugal pendulum can have several pendulum masses. In particular, according to the advantageous embodiment, the pendulum masses can be arranged asymmetrically in the circumferential direction. The imbalance properties of the crankshaft assembly can be favorably influenced by the non-uniform distribution over the circumference. In addition, it can be achieved that the region in which the pendulum masses move does not damage the stress-critical region of the crankshaft segment.

Alternatively or additionally, according to a preferred embodiment, the pendulum masses, in particular a resulting center of gravity of the pendulum mass(es), can be arranged essentially opposite the mass region of the crankshaft segment in the circumferential direction.

According to a preferred embodiment, a centering region for centered accommodation of the centrifugal pendulum can be formed on a radial outer circumference of the crankshaft segment. The centering region can be provided later by machining or already in the raw part on the crankshaft segment. Manufacturing costs can be saved as a result.

According to a preferred embodiment, a screw-on surface to which the centrifugal pendulum is attached can be formed on an axial end face of the crankshaft segment. Due to the axial attachment, a required swing angle of the centrifugal pendulum can be implemented particularly easily. The screw-on surface can be machined later or already provided in the raw part on the crankshaft segment. Manufacturing costs can be saved as a result. Preferably, threaded holes can be provided in the crankshaft segment in the region of the screw-on surface, so that the centrifugal pendulum (the carrier) can be easily screwed in.

It is particularly preferred if the screw-on surface is arranged radially externally to a connection region of the crankshaft segment, the connection region being designed to connect a second adjacent crankshaft segment to the crankshaft segment. This ensures that the crankshaft segment is not inadmissibly weakened in its stress-critical region due to the fastening of the centrifugal pendulum. For example, the screw-on surface can be arranged essentially opposite the mass region of the crankshaft segment in the circumferential direction.

It is further preferred if the friction device and the centrifugal pendulum are attached to the crankshaft segment, for example to the screw-on surface, via a common fastening device. This has the advantage that, for example, the number of threaded holes can be reduced so that the crankshaft segment is weakened as little as possible.

According to a preferred embodiment, the friction device can extend over a circumferential section of less than 360°. This means that the friction device is not designed to be completely circumferential in the circumferential direction. A circumferential direction is defined in particular in relation to an axis of rotation of the crankshaft segment. This has the advantage that the friction device can only be formed in that region in which it is required. In addition, a non-circular friction device has an advantageous effect on compensating for an imbalance caused by the crankshaft segment. The peripheral section can preferably be between 90° and 270°, in particular between 180° and 270°.

According to a preferred embodiment, the at least one pendulum mass extends over a predetermined circumferential section. The peripheral section over which the friction device extends can correspond in particular to the predetermined peripheral section. Thus, a normal force/axial force and a friction element contact are provided by the friction device only in the region of the pendulum mass(es). In addition, this has the advantage that the friction device does not require an additional contact surface in a region in which the pendulum mass(es) are not formed.

According to an advantageous development, the friction device can be segmented, in particular essentially in the form of a circular (ring) sector. Such a shape has proven to be particularly advantageous for use in a crankshaft segment. The receiving disc can preferably be formed over a circumferential section of less than 360°, for example between 90° and 270°, in particular between 180° and 270°. Alternatively or additionally, the friction element can preferably be formed over a circumferential section of less than 360°, for example between 90° and 270°, in particular between 180° and 270°. Alternatively or additionally, the spring element can preferably be formed over a circumferential section of less than 360°, for example between 90° and 270°, in particular between 180° and 270°. The cover plate can preferably be formed over a circumferential section of less than 360°, for example between 90° and 270°, in particular between 180° and 270°.

According to a preferred embodiment, the friction device can be arranged in the circumferential direction essentially opposite the mass region of the crankshaft segment that generates the imbalance and is in particular arranged eccentrically to the axis of rotation. This has the advantage that eliminating the mass of the friction device in the mass region can contribute to compensating for the imbalance.

The friction device can be viewed as part of the centrifugal pendulum. This means that, according to a preferred embodiment, the mass of the centrifugal pendulum and/or the friction device is dimensioned and the position on the crankshaft segment is selected in such a way that the centrifugal pendulum and/or the friction device during operation, i.e., when the crankshaft segment rotates, has an imbalance-compensating effect on the crankshaft segment.

In other words, the centrifugal pendulum and/or the friction device as such form/forms an imbalance compensation mass for the crankshaft/the crankshaft segment.

According to a preferred embodiment, the carrier of the centrifugal pendulum can be extended on a side opposite the pendulum mass in the circumferential direction in such a way that the friction device rests against the carrier. This means that the carrier forms an abutment for the friction device on the side opposite the pendulum mass in the circumferential direction. This has the advantage that even with an asymmetric assembly of the pendulum mass(es) over the circumference in the angular range within which the friction device has no abutment from the pendulum mass (es), one-sided loading and misalignment of the friction device can be avoided or counteracted. In other words, the missing abutment is compensated by the special geometry of the carrier of the centrifugal pendulum. Thus, a part of the carrier is provided to hold the pendulum mass(es) and the remaining part is designed in such a way that it provides a contact surface for the friction device.

In particular, the friction element of the friction device can rest against (or be supported on) the carrier. This means that the friction element rests against the pendulum mass/the pendulum masses in a first peripheral region and rests against the carrier in another, in particular essentially opposite, second peripheral region. A one-sided load on the friction element is thus avoided.

The friction device can preferably rest on the at least one pendulum mass and on the carrier on the same axial side. This has the advantage that the normal force applied by the spring element can be supported uniformly and/or over a (large) region.

According to an advantageous development, the carrier can have a bearing section extending in the radial direction for receiving the at least one pendulum mass and a contact section extending in the radial direction for supporting the friction device. The bearing section and the contact section are preferably arranged to be spaced parallel to one another in the axial direction. As a result, a flat contact surface for the friction device can be provided in an advantageous manner and at the same time the bearing of the pendulum mass on the carrier can be guaranteed.

According to the advantageous development, an axial distance between the bearing section and the contact section can essentially correspond to the thickness of the at least one pendulum mass. This has the advantage that a flat friction element can rest axially flush against the pendulum mass and the contact section or can be supported on it.

According to the embodiment, the bearing portion and the contact section may be connected by a connecting portion of the bracket, so that the bracket has a substantially S-shape in longitudinal section. This ensures sufficient rigidity and strength of the carrier.

In addition, it has proven to be advantageous if the contact section is formed by potting the carrier in the direction of the friction device. In this way, the required shape of the carrier can be produced with little effort.

Furthermore, it is expedient if the carrier is designed as a formed sheet metal part. For example, the carrier can be manufactured without cutting. In particular, the carrier can be produced by stamping and forming, for example by deep drawing. The carrier can thus be produced inexpensively and in large numbers.

The contact section can preferably have the shape of an arc of a circle in cross-section. This has the advantage that the contact section provides a suitable contact surface for a simple shape of the friction element.

In other words, the present disclosure relates to a crankshaft assembly in which a centrifugal pendulum subassembly is arranged on an imbalance compensation beam of a crankshaft segment. A receptacle for the FKP UZSB is provided on the crankshaft segment, which is machined or already designed in the blank in such a way that a centering seat, a screw-on surface and a region in which the pendulum mass(es) can vibrate is provided. A centrifugal pendulum carrier (flange) is arranged on the screw-on surface, which is screwed into threaded holes in the crankshaft segment in the non-stress-critical region. Additional friction, which acts on the centrifugal pendulum vibrating movement, is provided by a friction device, which improves the isolation of the natural frequency vibration of the crankshaft and reduces the required swing angle. The friction device has a potted receiving disc. A disc spring is supported on the one hand on the receiving disc and on the other hand a normal force acts on a friction element, which in turn rests on the pendulum mass. If necessary, a cover disc can also be provided between the disc spring and the friction element, so that the permissible surface pressure of the friction element is not exceeded. The friction element is designed to be non-rotatable with the receiving disc, so that the friction point is fixed between the friction element and the pendulum mass. The pendulum masses are arranged asymmetrically around the circumference so that they serve to compensate for the imbalance in the crankshaft. In particular, a rupture containment means can also be integrated into the receiving disc (supporting disc/mounting plate), for which purpose the mounting plate is extended radially outwards and potted over the centrifugal pendulum. Anti-twist protection between the mounting plate and the friction element (friction ring) can be implemented by means of recesses in the mounting plate and penetrations in the friction element, or alternatively by means of formed regions in the mounting plate, which engage in corresponding pockets in the friction element. The friction device can preferably not be circumferential, but only designed as a ring segment, whereby a normal force and friction ring contact is provided in the required region of the pendulum mass and there is no exposed region of the friction device that needs to be supported. In this way, eliminating the mass of the friction device in the region that is not required can also compensate for an imbalance caused by the mass of the crankshaft segment that has been removed for the centrifugal pendulum. A receiving disc, a spring element, a friction element and a cover disc can be segmented/not circumferential, but only present in the region of the pendulum masses. Furthermore, in particular in the case of a non-symmetrical assembly of the pendulum masses in the circumferential direction, the carrier of the centrifugal pendulum can be designed in such a way that it forms an abutment for the friction device. Thus, only a part of the carrier is provided for accommodating the pendulum masses and the remaining region is designed in such a way that a contact surface is provided for the friction device. More preferably, this contact surface can be formed by an annular region that is potted in the direction of the friction device.

BRIEF SUMMARY OF THE DRAWINGS

The present disclosure is explained below with the aid of drawings. In the figures.

DETAILED DESCRIPTION

The figures are merely schematic in nature and are intended solely for the purpose of helping to understand the present disclosure. The same elements are provided with the same reference symbols. The features of the individual embodiments can be interchanged with one another.

FIGS. 1 to 9 show different embodiments of a crankshaft assembly 1 for a motor vehicle drive train. The crankshaft assembly 1 has a crankshaft segment 2. The crankshaft segment 2 is, in particular, an axial section of a crankshaft. The crankshaft assembly 1 has a centrifugal pendulum 3 attached to the crankshaft segment. The centrifugal pendulum 3 serves to absorb a natural frequency vibration of the crankshaft or a main exciter order of the motor vehicle drive train.

The centrifugal pendulum 3 has a carrier 4 secured to the crankshaft segment. The carrier 4 is therefore attached to the crankshaft segment 2 in a non-rotatable manner. The centrifugal pendulum 3 has at least one pendulum mass 5. The pendulum mass 5 is attached to the carrier 4 so that it can move relative to the carrier 4 along a predetermined track. The absorber effect of the centrifugal pendulum 3 is achieved by the relative movement between the pendulum mass 5 and the carrier 4. In the illustrated embodiments, the centrifugal pendulum 3 has a plurality of pendulum masses 5 which are arranged asymmetrically in the circumferential direction/over the circumference. The circumferential direction is defined in relation to an axis of rotation of the crankshaft segment 2.

The mass of the centrifugal pendulum 3 is dimensioned and its position on the crankshaft segment 2 is arranged in such a way that the centrifugal pendulum 3 acts on the crankshaft segment 2 to compensate for imbalance during operation, i.e., when the crankshaft segment 2 is rotating. The crankshaft segment 2 has a mass region 6 which generates an imbalance during operation. The mass region 6 is arranged eccentrically to the axis of rotation. The mass and the position of the centrifugal pendulum 3 is therefore matched to the mass and the position of the mass region 6. The centrifugal pendulum 3 (in particular its pendulum masses 5) are arranged opposite to the mass region 6 in the circumferential direction. The centrifugal pendulum 3 is arranged in the axial direction (relative to the axis of rotation) at the same height as the mass region 6. The pendulum masses 5 are radially spaced the same distance from the axis of rotation as the mass region 6. In other words, the centrifugal pendulum 3 serves as an imbalance compensation element for the mass region 6. This means that the centrifugal pendulum 3 replaces an unbalanced mass for the crankshaft segment 2 (partially or completely).

The crankshaft assembly 1 has a friction device 7 connected to the carrier 4. The friction device 7 is attached to the carrier 4 and/or to the crankshaft segment 2 in a non-rotatable manner. The friction device 7 rests against the at least one pendulum mass 5 in such a way that when the pendulum mass 5 moves relative to the carrier 4, the friction device 7 applies a frictional torque counteracting the relative movement to the pendulum mass 5. The friction device 7 has a friction element 8 resting against the pendulum mass 5.

The friction device 7 has a receiving disc 9 which is connected to the carrier 4 in a non-rotatable manner. The friction element 8 is connected to the receiving disc 9 in a non-rotatable manner. The friction device 7 has a spring element 10 that is supported, in particular braced, axially between the friction element 8 and the receiving disc 9. The spring element 10 is designed, for example, as a disc spring or a corrugated spring. The spring element 10 applies a normal/axial force to the friction element 8, which presses the friction element 8 axially against the pendulum mass 5, so that when there is a relative movement between the friction element 8 fixed to the carrier and the at least one pendulum mass 5, the friction torque that counteracts the relative movement occurs.

The crankshaft segment 2 has an imbalance compensation beam 11. The imbalance compensation beam 11 is located opposite the mass region 6 in the circumferential direction. The crankshaft segment 2 has a frontal recess 12 (in the imbalance compensation beam 11) for receiving at least part of the centrifugal pendulum 3, in particular the pendulum masses 5. The recess 12 is dimensioned in such a way that it has an imbalance-compensating effect when the crankshaft segment 2 rotates. In particular, the mass removed for the recess 12 corresponds to a mass added by the centrifugal pendulum 3.

The crankshaft segment 2 has a connection region 13 which is designed to attach an (axially adjacent) second crankshaft segment to it. The connection region 13 is arranged centrally on the crankshaft segment 2. The recess 12 is arranged radially externally to the connection region 13. The crankshaft segment 13 has a centering region 14 on its radial outer circumference for receiving the centrifugal pendulum 3 in a centered manner. The crankshaft segment 13 has a screw-on region/a screw-on surface 15 on an axial end face, to which the centrifugal pendulum 3/the carrier 4 is fastened. The screw-on surface 15 is arranged radially externally to the connection region 13. The centrifugal pendulum 3 is attached axially to the screw-on surface 15 via a fastening device 16, in particular in the form of a plurality of screws. For this purpose, threaded bores are provided in the screw-on surface 15, into which the fastening device 16 is screwed.

The receiving disc 9 of the friction device 7 is designed as a potted sheet metal component. The receiving disc 9 has an (inner) first radial section 17 serving as a fastening section. The radial section 17 is firmly attached to the carrier 4 and the crankshaft segment 2 via the fastening device. From a radially outer end of the first radial section 17, an axial section 18 extends in the axial direction away from the crankshaft segment 2/the screw-on surface 15. The axial section 18 extends radially inside the pendulum masses 5. An (outer) second radial section 19 extends outwards in the radial direction from an axially remote end of the axial section 18. As a result, the receiving disc 9 has an S-shape at least in sections. The spring element 10 and/or the friction element 8 are supported axially on the receiving disc 9 in the region of the second radial section 19. An axial projection 20 extends in the axial direction toward the pendulum masses 5 from a radially outer end of the second radial section 19. The spring element 10 and/or the friction element 8 are supported on the axial projection 20 in the circumferential direction.

In the embodiment shown, the centrifugal pendulum 3 has a plurality of pendulum mass packages. Each pendulum mass package has two pendulum masses 5, which are held by one or more spacer elements 21 spaced to be axially parallel. The two pendulum masses 5 are connected to one another by a rivet 22, for example.

Figure 1:
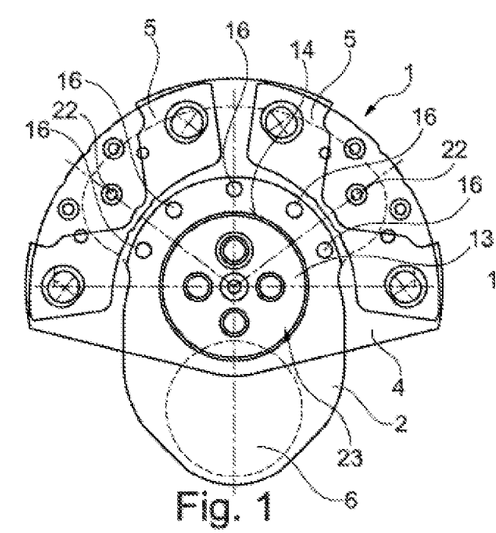
FIGS. 1 and 2 show a longitudinal sectional view and a plan view of a crankshaft assembly in a first embodiment.
Figure 2:
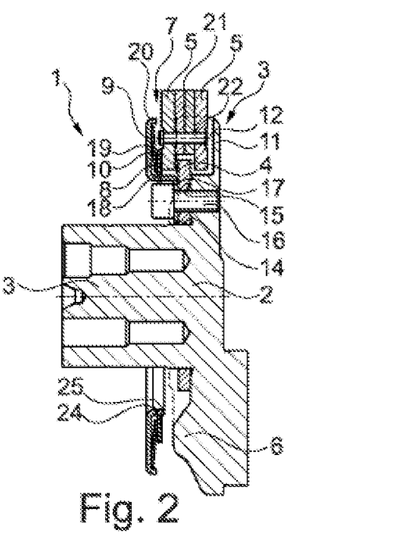

FIGS. 1 and 2 show a first embodiment of the crankshaft assembly 1. FIG. 1 shows a plan view without showing the friction device 7. The carrier 4 has a central through hole 23 via which the carrier 4 is centered on the centering region 14. In the first embodiment, the friction element 8 is designed as a friction ring running in the circumferential direction. The friction element 8 has form-fitting elements 24 on its radial inner side, which engage corresponding recesses 25 in the receiving disc 9 for anti-twist protection in a form-fitting manner. The friction element 8 is thus fastened radially on the inside. The receiving disc 9 is designed to run around in the circumferential direction. The second radial section 19 and/or the axial projection 20 are/is of rotationally symmetrical design.

Figure 3:
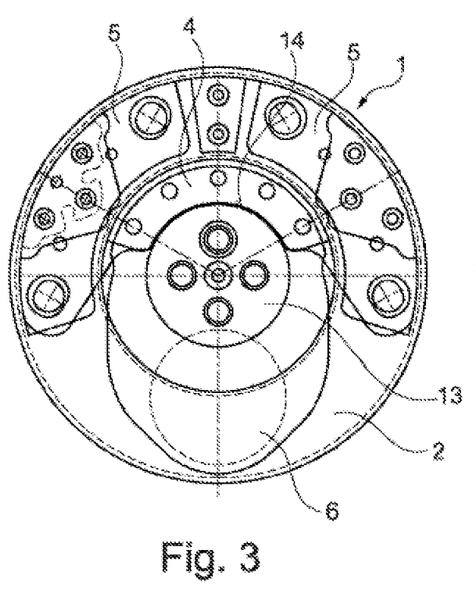
FIGS. 3 and 4 show a longitudinal sectional view and a plan view of a crankshaft assembly in a second embodiment.
Figure 4:
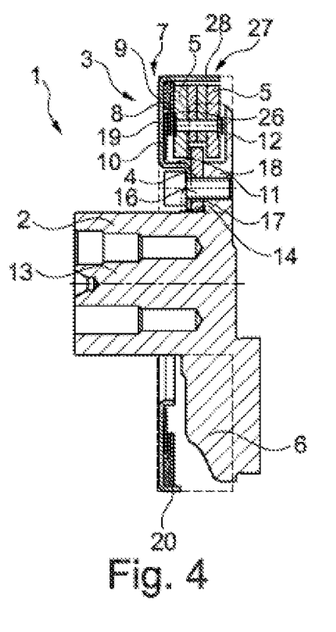

FIGS. 3 and 4 show a second embodiment of the crankshaft assembly 1. Only differences from the first embodiment are explained below. The friction device 7 has an additional cover disc 26 which is arranged in the axial direction between the spring element 10 and the friction element 8. The crankshaft assembly 1 has a rupture containment means 27. The rupture containment means 27 engages radially externally around the centrifugal pendulum 3. As a result, when the centrifugal pendulum 3 rotates, loose components are caught by the rupture containment means 27. The rupture containment means 27 are formed by the receiving disc 9. The second radial section 19 is extended radially outwards, so that it protrudes radially outwards beyond the pendulum masses 5. From a radially outer end of the second radial section 19 an outer axial section 28 extends in the axial direction towards the crankshaft segment 2. The outer axial section 28 extends axially beyond the pendulum masses 5. This means that the axial projection 20 is lengthened in the axial direction, at least in the peripheral region of the pendulum masses 5, in order to form the outer axial section 28. The pendulum masses 5 are accordingly potted by the receiving disc 9. To form the rupture containment means 27, the receiving disc 9 has a U-shape, which engages axially around the pendulum masses 5 in a potted manner. The friction element 8 is fastened radially on the outside of the receiving disc 9 to prevent rotation. For example, the friction element 8 and the receiving disc 9 engage one another. The friction element 8 is supported in a radially inner region on the cover disc 26 and in a radially outer region on the receiving disc 9. The carrier 4 extends approximately in the shape of a crescent in the region of the pendulum masses 5.

Figure 5:
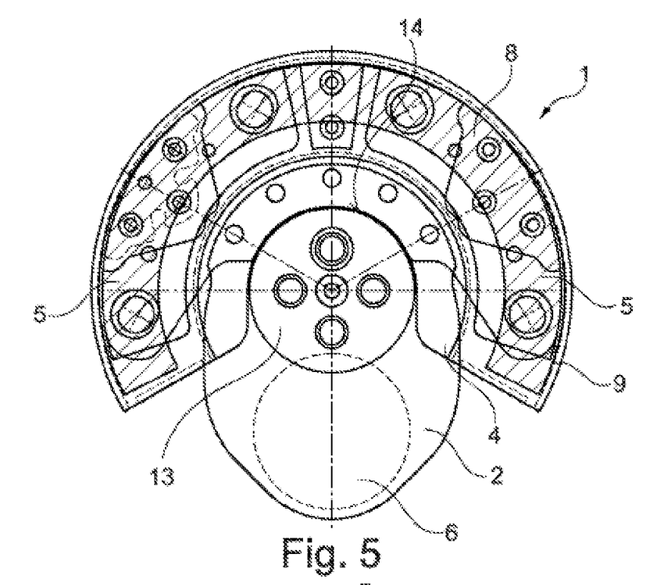
FIGS. 5 and 6 show a longitudinal sectional view and a plan view of a crankshaft assembly in a third embodiment.
Figure 6:
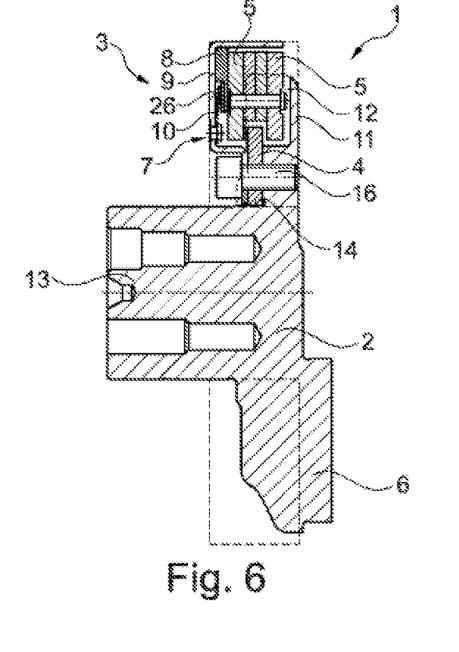

FIGS. 5 and 6 show a third embodiment of the crankshaft assembly 1. Only differences from the first or second embodiment are explained below. In the third embodiment, the friction device 7, in particular the receiving disc 9, the friction element 8, the spring element 10 and/or the cover disc 26, extends over a circumferential section of less than 360°. This means that the friction device 7 is not designed to be completely circumferential in the circumferential direction. The peripheral section is between 90° and 270°, in particular between 180° and 270°. The peripheral section essentially corresponds to a predetermined peripheral section over which the pendulum masses 5 extend. The friction device 7 is segmented, in the embodiment shown in the form of a circular (ring) sector. The friction device 7 can be regarded as part of the centrifugal pendulum 3, so that the design, dimensioning and positioning of the friction device 7 also has an imbalance-compensating effect on the crankshaft segment 2 during operation.

Figure 7:
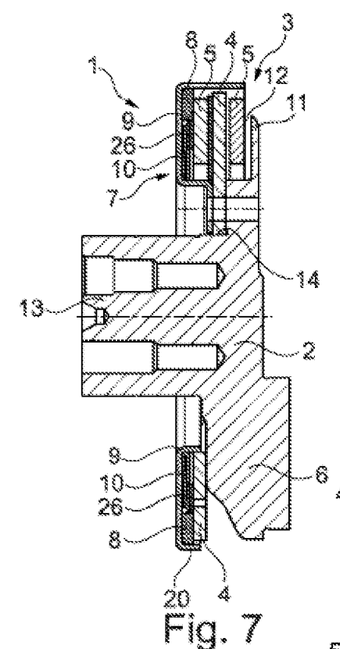
FIGS. 7 to 9 show a longitudinal sectional view and perspective views of a crankshaft assembly in a fourth embodiment.
Figure 8:
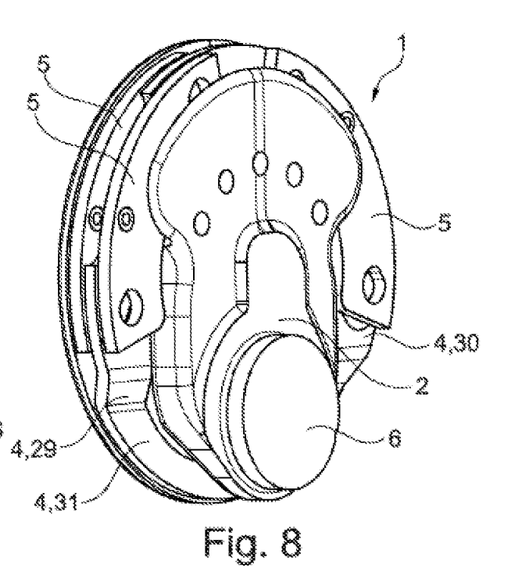
Figure 9:
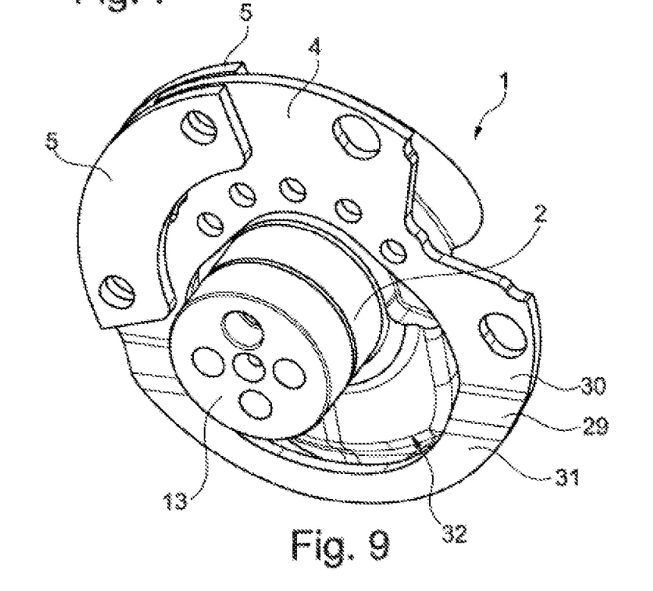

FIGS. 7 to 9 show a fourth embodiment of the crankshaft assembly 1. Only differences from the first, second or third embodiment are explained below. In the fourth embodiment, the carrier 4 of the centrifugal pendulum 3 is extended on a side opposite the pendulum masses 5 in the circumferential direction in such a way that the friction device 7 rests against the carrier 4. The carrier 4 thus extends in the radial direction and circumferential direction up to the mass region 6. The carrier 4 has a connecting section in the form of an axial potting 29 which connects a first radial section 30 adjacent to the pendulum masses 5 in the circumferential direction to a second radial section 31 adjacent to the mass region 6 in the circumferential direction. The second radial section 31 is potted towards the friction device 7. The first radial section 30 is arranged to be spaced apart axially and parallel to the second radial section 31. The first radial section 30 serves as a bearing section for receiving the pendulum masses 5. The second radial section 31 serves as a contact section against which the friction device 7 rests. In particular, the friction element 8 rests on the same axial side in one circumferential section against the second radial section 31 and in another circumferential section against the pendulum masses 5. The carrier 4 has a through hole 32. The through hole 32 is formed eccentrically. In a region adjacent to the pendulum masses 5 in the circumferential direction, a radial inner side/inner surface of the carrier 4 rests against the centering region 14. The through-hole 32 extends further radially outwards in a region adjacent to the mass region 6 in the circumferential direction, so that the carrier 4 rests against the crankshaft segment 2 only over a circumferential section that is less than 360°.

LIST OF REFERENCE SYMBOLS

1 Crankshaft assembly
2 Crankshaft segment
3 Centrifugal pendulum
4 Carrier
5 Pendulum mass
6 Mass region
7 Friction device
8 Friction element
9 Receiving disc
10 Spring element
11 Imbalance compensation beam
12 Recess
13 Connection region
14 Centering region
15 Screw-on surface
16 Fastening device
17 First radial section
18 Axial section
19 Second radial section
20 Axial protrusion
21 Spacing element
22 Rivet
23 Through hole
24 Form-fitting element
25 Recess
26 Cover disc
27 Rupture containment means
28 Axial section
29 Potting
30 First radial section
31 Second radial section
32 Through hole

What is claimed is:

1. A crankshaft assembly for a motor vehicle drive train, comprising:
a crankshaft segment; and
a centrifugal pendulum secured to the crankshaft segment, the centrifugal pendulum including a carrier secured to the crankshaft segment and at least one pendulum mass that moves relative to the carrier along a predetermined track, the crankshaft assembly having a rupture containment means, which engages radially externally around the centrifugal pendulum such that components of the centrifugal pendulum coming lose during rotation of the centrifugal pendulum are collected by the rupture containment means,
wherein the crankshaft assembly has a friction device which is connected to the carrier and which rests against the at least one pendulum mass in such a way that the friction device applies to the pendulum mass a frictional moment counteracting a relative movement when the pendulum mass moves relative to the carrier,
wherein the friction device has a friction element resting against the pendulum mass, a receiving disc connected to the carrier and a spring element supported axially between the friction element and the receiving disc, wherein the receiving disc forms the rupture containment means,
wherein the friction element is received in the receiving disc in a non-rotatable manner on a radial outer side of the friction element.

2. The crankshaft assembly according to claim 1, wherein the rupture containment means has a radial section which extends radially outwards on a first axial side of the centrifugal pendulum and an axial section which extends radially outside of the centrifugal pendulum from the radial section in an axial direction to a second axial side of the centrifugal pendulum.

3. The crankshaft assembly according to claim 1, wherein the receiving disc is a potted sheet metal component.

4. The crankshaft assembly according to claim 1, wherein the friction element has radially outwardly protruding projections which engage in corresponding recesses in the receiving disc to prevent rotation.

5. The crankshaft assembly according to claim 1, wherein the receiving disc has formed regions which project radially inward and which engage in corresponding pockets of the friction element to prevent rotation.

6. The crankshaft assembly according to claim 1, wherein the friction element rests axially on a radial section of the receiving disc.

7. The crankshaft assembly according to claim 2, wherein the axial section extends over a circumferential section of less than 360°.

8. A crankshaft assembly for a motor vehicle drive train, comprising:
a crankshaft segment; and
a centrifugal pendulum secured to the crankshaft segment, the centrifugal pendulum including a carrier secured to the crankshaft segment and at least one pendulum mass that moves relative to the carrier along a predetermined track, the crankshaft assembly including a receiving disc extending radially outside of the carrier and the at least one pendulum mass, the crankshaft segment including imbalance compensation beam on an axially opposite side of the centrifugal pendulum as the receiving disc, the imbalance compensation beam including a frontal recess receiving the at least one pendulum mass.

9. The crankshaft assembly according to claim 8, wherein the receiving disc has a U-shaped cross-section and the at least one pendulum mass is potted by the receiving disc.

10. The crankshaft assembly according to claim 8, wherein the receiving disc includes:
a radial section axially aligned with the carrier and the at least one pendulum mass; and
an axial section at a radially outer end of the radial section, the axial section extending radially outside of the carrier and the at least one pendulum mass.

11. The crankshaft assembly according to claim 10, wherein the at least one pendulum mass includes a first pendulum mass on a first axial side of the carrier and a second pendulum mass on a second axial side of the carrier, the axial section extending radially outside of the first and second pendulum masses and axially beyond the first and second pendulum masses.

12. The crankshaft assembly according to claim 10, wherein the centrifugal pendulum includes a friction device axially between the radial section and a first pendulum mass of the at least one pendulum mass and received inside of the receiving disc.

13. The crankshaft assembly according to claim 12, wherein the friction device rests against the first pendulum mass in such a way that when the first pendulum mass moves relative to the carrier, the friction device applies a frictional torque counteracting a relative movement to the first pendulum mass.

14. The crankshaft assembly according to claim 13, wherein the friction device includes a friction element and a spring, the spring axially between the radial section and the friction element to press the friction element axially against the first pendulum mass.

15. The crankshaft assembly according to claim 8, wherein the centrifugal pendulum includes a fastening device fastening the receiving disc to the carrier radially inside of the at least one pendulum mass.

16. A method of constructing a crankshaft assembly for a motor vehicle drive train, the method comprising:
non-rotatably connecting a carrier of a centrifugal pendulum to a crankshaft segment;
movably connecting at least one pendulum mass to the carrier;
non-rotatably connecting a receiving disc to the carrier, an axial section of the receiving disc extending axially at a location radially outside of the carrier and the at least one pendulum mass; and
connecting a friction device to the carrier to cause the friction device to rest against the at least one pendulum mass in such a way that the friction device applies to the pendulum mass a frictional moment counteracting a relative movement when the pendulum mass moves relative to the carrier, the friction device including a spring element and/or a friction element supported axially on a radial section of the receiving disc and supported circumferentially on an axial projection of the receiving disc.

17. The method of constructing the crankshaft assembly as recited in claim 16, wherein the axial projection extends in an axial direction toward the at least one pendulum masses from a radially outer end of the radial section.

* * * * *